Figure 1:
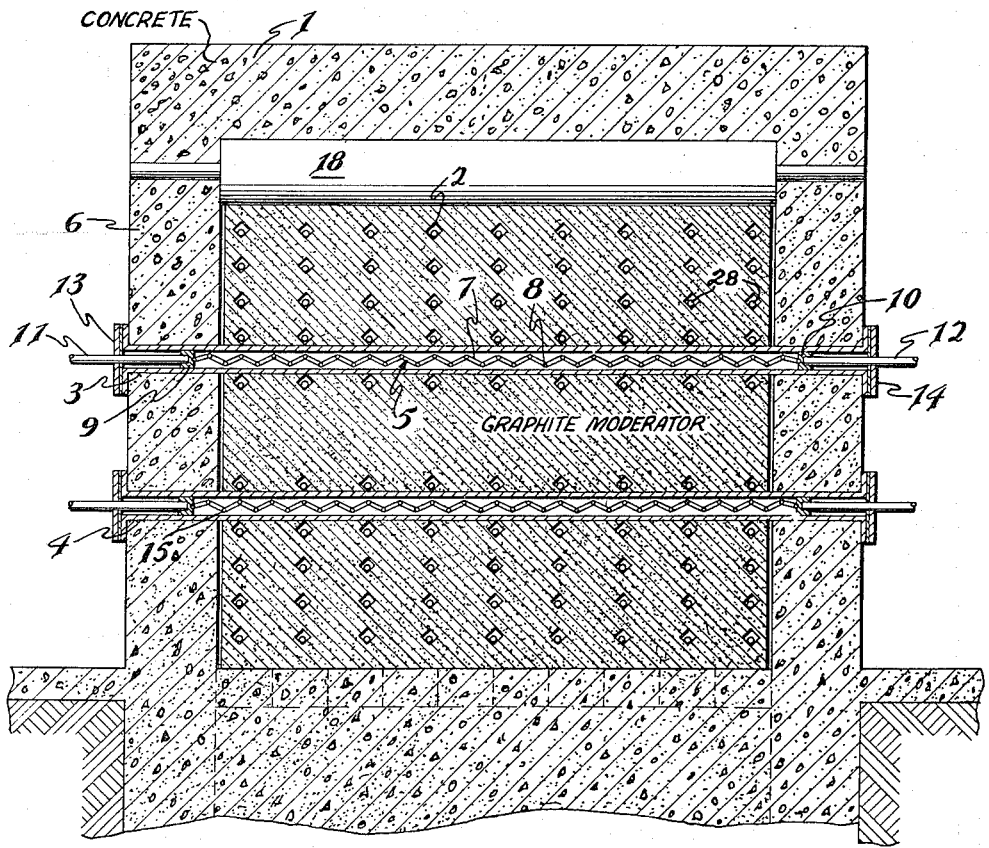

Sept. 22, 1959     L. B. BORST     2,905,612

CENTRAL CONTROL SYSTEM

Filed Sept. 9, 1944

INVENTOR.
Lyle B. Borst
BY

United States Patent Office 2,905,612
Patented Sept. 22, 1959

2,905,612
CENTRAL CONTROL SYSTEM

Lyle B. Borst, Oak Ridge, Tenn., assignor to the United States of America as represented by the United States Atomic Energy Commission Application September 9, 1944, Serial No. 553,429

10 Claims. (Cl. 204—193.2)

This invention relates to improvements in the control of chain reactions involving fission. More particularly, the invention relates to improved apparatus, means, and methods for control, which are applicable to chain reactions involving nuclear fission.

The chain reactions of the type under consideration have been known in the art and have been carried out prior to my invention. That is, in the field of nuclear physics, fission has been caused to occur in uranium materials setting up a chain reaction. Such reactions are extremely vigorous. Although considerable work has been done in this field, because of the magnitude of the problems involved, there are still many developments required for rendering such processes susceptible of widespread use. In the publication The "Particles" of Modern Physics by Stranathan published by the Blakiston Company, Philadephia, 1943, at page 450, reactions of the type under consideration are discussed. For example, it is there stated to the effect that it has been calculated that one cubic meter of $U_3O_8$ might develop $10^{12}$ kilowatt hours in less than 0.01 second. The problem today is not only to propagate such a chain reaction, but also to control the speed of the reaction. It is apparent from the magnitude of the energies involved and the speed of reaction that there is a considerable problem to provide suitable means for the control of such types of reactions and methods for accomplishing the controlled reaction.

Certain workers in this field have already made substantial progress in developing methods and apparatus for accomplishing the aforementioned type of reactions. For example, one type of means which has been developed for carrying out such chain reactions is known as a pile, neutron reactor or by similar terms and will be described herein in further detail. As will be described also, such apparatus has been controlled by rigid control means, such as for example straight control rods. While this type of arrangement has given good results, by the present invention there is provided alternative apparatus for accomplishing control and alternative methods described which are thought to possess certain advantages as will be described hereinafter.

I have discovered that control of chain reactions of the type in question may be obtained by non-rigid types of control means, and that a method of satisfactory control may be carried out therewith.

This invention has for one object to provide an improved means for the control of chain reactions involving nuclear fission.

Another object is to provide a non-rigid type of control means for such chain reactions.

Still another object is to provide a variable type control for such reactions.

Another object is to provide a control means particularly suitable for use in conjunction with the control of chain reactions involving the fission of $U^{235}$.

Another object is to provide a control for chain reactions that may be operated on a sizable scale involving high energy releases.

Still another object is to provide control means for reactions of the type described which means are relatively simple in construction and operation.

A still further object is to provide a method for the control of chain reactions involving fission.

Another object is to provide a variable control method.

Still another object is to provide a method of control which may be applied to chain reactions that include the fission of $U^{235}$.

Another object is to provide a method of control which lends itself to coupling with automatic devices.

Other objects will appear hereinafter.

Inasmuch as the type of reaction and related information concerning the present subject matter is relatively new and known in the art to a limited extent, certain preliminary description is set forth primarily for background. That is, the construction of means for and the operations of nuclear reactions are described below for obtaining a better understanding of the conditions and environment under which my improved control device and method may be utilized. However, the specific details of constructing a pile per se or comparable device for carrying out chain reactions is not a limitation on the present invention, and is not claimed herein except that insofar as it may cooperate with the particular type of control and method described herein.

The particular manner to be described for accomplishing a chain reaction will be generically referred to as a "pile" formation. The pile constitutes an environment in which metallic uranium or equivalent material is exposed under conditions whereby nuclear fission is obtained along with the generation of fission products, various radiations and the release of energy.

Various materials (i.e. elements with a light nucleus) as heavy hydrogen, helium, beryllium, and carbon may be used as the environment for the material undergoing fission. For example, high purity graphite blocks constitute a convenient construction material. Suitable openings may be provided for charging into the apparatus the material to undergo fission, such as, for example, natural uranium. Also, suitable openings or other provisions may be made for permitting access to the interior of the apparatus for other purposes.

The shape of the pile or reactor may, for example, be spherical, but for simplicity a rectangular or cubical pile is the particular embodiment described herein. The particular dimensions and spacing of the uranium material therein would be governed by the overall size, the amount of metal to undergo pile treatment and similar factors. A construction of the order of 7 to 20 feet or more on each dimension would be satisfactory depending on the purity of the construction materials, the geometry and related factors. As indicated, suitable openings or channels may be provided for placing in and removing from the pile, the metal to undergo the chain reaction.

As indicated, there have also been provided in some prior art constructions control means for use in operating the apparatus in which the chain reaction takes place. This has generally included straight rigid rods adapted to be inserted into and withdrawn from the apparatus. These regulating rods and other means, such as shot or balls, may be comprised of cadmium, boron, mercury, gadolinium or alloys thereof. For example, boron alloy steel is satisfactory. Such materials absorb neutrons as will be discussed. The entire environment may be enclosed in suitable shielding, such as concrete containing barium sulfate for confining the radiations therewithin.

When a properly constructed pile has been charged with natural uranium material such as material containing $_{92}U^{235}$, and the control means are adjusted, fission will be brought about by a random slow neutron or by the spontaneous splitting of an atom of $_{92}U^{235}$, referred to herein as U. As is known, natural uranium has a concentration of about 1 part of $U^{235}$ to 139 parts of $U^{238}$. When fission occurs in the environment described with the emission of neutrons, the neutrons that escape from the apparatus are limited and the speeds of others are reduced, permitting the setting up of a chain reaction. By suitable control, as will be described, the chain reaction proceeds giving off radiations and liberating large amounts of energy.

For a further understanding of the illustrative construction which has been discussed broadly in the preceding paragraphs, reference is made to the attached drawing forming a part of the present application.

Figure 2:
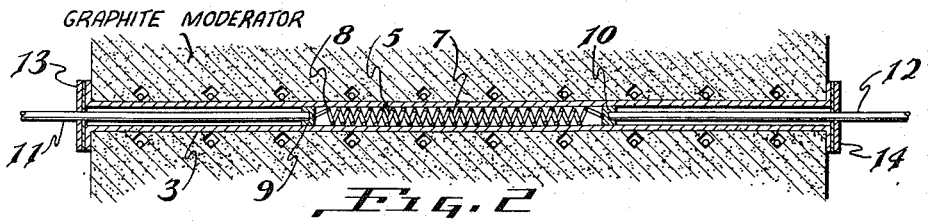
Figure 3:
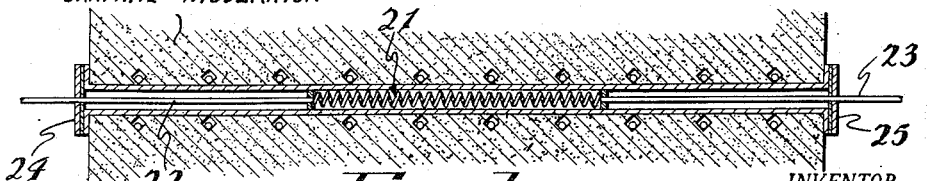

Fig. 1 is a diagrammatic sectional view of a type of unit in connection with which my invention may be used for control. Fig. 2 is a detailed view of one type of control means. Fig. 3 is a detailed view of another embodiment of my control means.

Referring to Fig. 1, 1 represents the overall construction of an illustrative graphite pile. The passageways, 2, are channels for U or equivalent material, as above discussed. Suitable provisions are made in the shielding 6 which encloses the graphite for access to the channels so that the channels may be charged with the metal to undergo fission in the chain reaction. Further openings and passageways are provided as at 3 and 4 for the introduction of control means such as means 5 in accordance with the present invention. These passageways are shown horizontally positioned and transverse with respect to the metal channels. However, the means may be inserted from the top or otherwise. The particular position from which the controls enter would merely be in accordance with good engineering practice. That is, consideration would be given to convenience of locating control driving mechanism and related parts so as to least interfere with apparatus operation. The control means would, however, be preferably located so its effectiveness, as will be discussed, would operate in the zone of high neutron intensity as in or near the center of the pile or other media in which the chain reaction is being carried out in the constructions illustrated herein. Although control means 5 is indicated as approximately horizontally positioned through the pile, other positioning may be employed. Thus, the means may be angularly positioned as on a slope.

The control means 5 of the present invention comprises a plurality of segments 7 linked or pinned at 8 or, if the material is inherently flexible, merely a crease or bend in the control means at 8 is sufficient. In other words, the member 5 constitutes a flexible non-rigid link construction which is adapted to be extended to substantially a linear member for exposing a large surface of neutron absorber when it is desired to check or stop the chain reaction. On the other hand, the member may be compressed and its volume concentrated so that it has less opportunity to absorb neutrons; consequently the reaction will multiply. The ends of the non-rigid flexible member are attached as at 9 and 10 to guide members of ordinary non-neutron absorbing construction materials adapted to slide back and forth in the passageway 3.

Members 9 and 10 are connected to members 11 and 12 which are merely connecting rods of conventional non-neutron absorbing materials adapted to be attached to hydraulic or electrical means (not shown). The type of motivating means for moving members 11 and 12 in and out may be comparable to those used in prior art constructions for moving straight rigid control rods. As there are a number of constructions of electrical and hydraulic mechanisms available, further description of such parts is unnecessary. The particular type of motivating equipment for moving parts 11 and 12 is not a limitation on the present invention.

Parts 11 and 12 extend through stuffing boxes 13 and 14 which may be constructed in a conventional manner not only permitting members 11 and 12 to move inward and outward, but to constitute shielding. In other words, boxes 13 and 14 may be filled with neutron shielding materials and gamma absorbing materials such as lead, wood, certain plastics or the like for preventing the escape of any radiations which might be emitted through these openings where the control mechanism is installed.

In addition to the passageway containing control means just described, there may be further control means of identical construction, or construction in accordance with other embodiments to be described, positioned as at 15. Inasmuch as in the present construction the control means at 15 is the same as that already described, further description is unnecessary. In general, while a single control means may be employed, preferably several smaller control means of the type of the present invention would be preferred. These control means would be positioned about the central axis of the medium in which the chain reaction involving fission was being carried out in the constructions of the type described herein, namely in the vicinity where the neutron energies and intensities are greatest.

It will be observed from the foregoing that I have provided a non-rigid movable type of control mechanism. The exact details of the construction may be varied. In Fig. 1 the link type of construction has been shown in a partially extended position.

Referring to Fig. 2, the link construction is shown in a compressed condition near the center of the media in which the chain reaction is carried out. The various parts such as segments 7 may be constructed of any suitable neutron absorbing material susceptible of fabrication. As is known, a large number of materials, excepting helium, will absorb neutrons. However, since certain of these materials as referred to above, namely boron, cadmium, and the like, possess much greater absorption properties, it would be preferred to construct the segments 7 of boron steel, cadmium plated steel, or the like.

It may be seen from the foregoing that I have provided means for the control of chain reactions by a non-rigid neutron absorber within the environment in which the chain reaction takes place, rather than by the use of straight rigid rods such as has been employed in the prior art. A variable volume effect of neutron absorber within the environment may be obtained by compression or expansion of the flexible absorber. In the instance that a springy material is employed, only driving mechanism to push or pull, as the case may be, the member into compression or tension would be required as the resiliency of the material would furnish the movement in the opposite direction.

Several embodiments of the construction of my non-rigid control are contemplated. Referring to Fig. 3, there is shown a construction comprising a coiled spring control. In this figure the spring is indicated in a partly compressed condition at 21. The control spring has attached thereto members 22 and 23, which correspond with members 11 and 12 for applying to the spring control means the inward or outward movement as may be desired. Also, there would be provided suitable stuffing boxes, indicated at 24 and 25. The spring may be fabricated from cadmium plated spring steel, the cadmium functioning as neutron absorbing medium. By compression, the volume of neutron absorber would be concentrated or localized within the pile producing an effect comparable to the prior art control wherein a rigid control rod is partially or substantially completely removed from the pile. However, by my improved construction a more effective exposure of neutron absorber, namely in the form of an extended spring, may be positioned nearer or in the zone of neutron activity when it is desired to check or retard the reaction.

That is, by applying tension to the spring member 21 so that it is elongated across the zone of neutron activity, the neutron absorber effectively exposed to neutrons is increased thereby rendering the control comparable to a situation where in the prior art the rigid control rod is inserted into the pile a substantial distance or permitted to extend through the pile.

In place of motivating means as an electric motor or hydraulic piston for moving the parts 11 and 12 toward or away from the pile, a compressed gas may be injected against parts 9 and 10 to cause the compression of my flexible control to concentrate it near the center of the unit. By releasing the gas pressure, the resiliency of the member 5 would function to extend the links to an elongated position.

However, in such a construction, rather than employing air as the motivating media, the gas would comprise carbon dioxide or other materials not materially affected by radiation. Preferably mechanical device outside of the pile which imparts thrust or push, may be employed as discussed. In general, it is preferred not to have moving mechanical parts such as motors or the like within the pile.

The shielding 6, already mentioned, may preferably inclose the graphite section on all sides but may be spaced therefrom at some points to provide passageway around and through the pile for the circulation of a cooling medium. Suitable damper means generally indicated at 18 may be placed at one or more points for controlling and directing this air flow. Metal undergoing fission is generally indicated at 28. As indicated, the particular construction of a pile or equivalent construction excepting that relating to the control mechanism and associated parts and its operation are not a part of the present invention nor regarded as a limitation herein.

For a better understanding of the control problem and the functioning of my apparatus, a brief description is given respecting chain reactions involving fission as respects $U^{235}$. An illustrative reaction showing the general mechanism of a fission process is as follows:

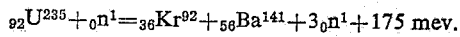

$$_{92}U^{235} + _{0}n^{1} = _{36}Kr^{92} + _{56}Ba^{141} + 3_{0}n^{1} + 175 \text{ mev.}$$

As indicated, the reaction of the aforementioned type may be started by a random slow neutron or by the spontaneous fission of an atom of $U^{235}$. From the above reaction it will be noted that several neutrons are emitted. While these neutrons may be consumed in various ways such as by the slowing down caused in the graphite and a certain number lost into space or consumed in other ways, for the purpose of this particular invention it is necessary to primarily consider only those neutrons which cause fission of additional nuclei which in turn generate more neutrons some of which similarly function in causing fission. In other words, the chain reaction once established under the proper conditions may tend to multiply at an extremely rapid rate. Also, it has been found that the intensity of neutrons is greater within the interior of the environment than at the extreme edges. That is, in apparatus of the type described, from the geometrical center thereof outwardly two-thirds to three-quarters of the distance to the outside of the graphite constitutes the zone of neutron activity. Referring to Figs. 2 and 3, the non-rigid control means shown in a partially compressed condition may be considered as extending across, for example 40% to 60% of the zone.

Consequently, by my construction when the non-rigid control means of the present invention, which is constructed of neutron absorbing material, is extended from or near the center of the unit to the outside edges, there is provided a substantial amount of neutron absorption material throughout the entire zone of high neutron activity. This exposure of neutron absorption material from one, or preferably a plurality of non-rigid control means suitably positioned around the center and adapted to extend across the entire zone of highest activity functions to terminate the chain reaction by absorbing neutrons and thereby preventing their capture by other nuclei wherein fission would occur.

On the other hand, when my non-rigid control means is in a compressed position, the neutron absorbing capacity is reduced to a lower value and consequently the chain reaction is permitted to multiply. By calibrations between the two extremes, my non-rigid control means may be compressed to the proper extent, depending upon the particular size of the unit, the amount of uranium or equivalent materials charged therein and similar factors so that the chain reaction continues, but does not multiply to such an extent as to be undesirable.

The coordination of the degree of compression or elongation of my control means may be obtained by connecting the electric motor or other driving means therefor with ionization chambers and thermometers positioned within the unit which records the neutron concentration and the temperature increases. If these instruments indicated an undesirable increase in neutron generation and temperature, the instruments would operate relays causing the extension of my non-rigid control means such as the spring or links to a greater degree through the zone of activity thereby slowing down the reaction. Such types of automatic control and their interconnections in the present type system have been worked out by others and form no part of the present invention. It is merely desired that the most suitable instruments available be used in conjunction with initiating the movement such as compression or expansion of my control mechanism.

There are other embodiments which may be constructed in addition to the preferred constructions above described, such as flexible link or coiled spring means. For example, construction in the form of bellows or accordion configuration made from metals containing alloying elements having neutron absorbing elements may be employed. From the preceding description, it is apparent that by compressing such means the effective amount of neutron absorber exposed within the environment sustaining the chain reaction is decreased thereby permitting the reaction to multiply, and that by the expanding or elongating of such construction the effective absorber exposed would be increased thereby retarding or checking the reaction. Preferably a gas not materially affected by radiation, as referred to above, may be employed for extending such bellows construction.

Other changes and modifications may be included as will be apparent to those skilled in the art. It is to be understood that all matters contained in the above description and examples shall be interpreted as illustrative and not limitative of the scope of this invention.

I claim:

1. In combination with a neutronic reactor, a longitudinally expansible mechanism disposed centrally in said reactor with respect to its direction of expansion and compression, said mechanism containing throughout its length an element selected from the class consisting of boron, cadmium, mercury and gadolinium, and a pair of longitudinally movable rods connected to opposite ends of said mechanism, respectively, and extending exteriorly of said reactor, whereby, by equal movements of said rods in opposite directions, said mechanism may be expanded or compressed while maintaining a symmetrical position within said reactor.

2. In combination with a neutronic reactor which includes a central active portion containing fissionable material and a radiation shield surrounding said active portion, control apparatus for controlling the reactivity of said reactor, said apparatus comprising a longitudinally expansible mechanism containing neutron absorbing material and disposed centrally in said reactor with respect to the direction of expansion and compression, and a pair of longitudinally movable rods connected to opposing ends of said mechanism, respectively, and extending exteriorly of said reactor, whereby by equal movements of said rods in opposite directions said mechanism may be expanded or compressed while maintaining a symmetrical position within said reactor.

3. In combination with a neutronic reactor which includes a central active portion containing fissionable material and a radiation shield surrounding said active portion, control apparatus for controlling the reactivity of said reactor, said apparatus comprising a longitudinally expansible coiled spring containing neutron absorbing material and disposed centrally in said reactor with respect to the direction of expansion and compression, and a pair of longitudinally movable rods connected to opposing ends of said spring, respectively, and extending exteriorly of said reactor, whereby by equal movements of said rods in opposite directions said spring may be expanded or compressed while maintaining a symmetrical position within said reactor.

4. In combination with a neutronic reactor which includes a central active portion containing fissionable material and a radiation shield surrounding said active portion, control apparatus for controlling the reactivity of said reactor, said apparatus comprising a longitudinally expansible mechanism formed of a plurality of interconnected link elements containing neutron absorbing material, said mechanism being disposed centrally in said reactor with respect to the direction of expansion and compression, and a pair of longitudinally movable rods connected to opposing ends of said mechanism, respectively, and extending exteriorly of said reactor, whereby by equal movements of said rods in opposite directions said mechanism may be expanded or compressed while maintaining a symmetrical position within said reactor.

5. In combination with a neutronic reactor which includes a central active portion containing fissionable material and a radiation shield surrounding said active portion, control apparatus for controlling the reactivity of said reactor, said apparatus comprising an expansible mechanism containing neutron absorbing material, said mechanism being wholly disposed within said active portion in both its expanded and its compressed condition.

6. In combination with a neutronic reactor which includes a central active portion containing fissionable material and a radiation shield surrounding said active portion, control apparatus for controlling the reactivity of said reactor, said apparatus comprising an expansible coiled spring containing neutron absorbing material, said spring being wholly disposed within said active portion in both its expanded and its compressed condition.

7. In combination with a neutronic reactor which includes a central active portion containing fissionable material and a radiation shield surrounding said active portion, control apparatus for controlling the reactivity of said reactor, said apparatus comprising an expansible mechanism formed of a plurality of interconnected link elements containing neutron absorbing material, said mechanism being wholly disposed within said active portion in both its expanded and its compressed condition.

8. In combination with a neutronic reactor which includes a central active portion containing fissionable material and a radiation shield surrounding said active portion, control apparatus for controlling the reactivity of said reactor, said apparatus comprising a longitudinally expansible mechanism containing neutron absorbing material, said mechanism being disposed wholly within said active portion and centrally thereof with respect to the direction of expansion and compression, and a pair of longitudinally movable rods connected to opposing ends of said mechanism, respectively, and extending through said shield exteriorly of said reactor, whereby by equal movements of said rods in opposite directions said mechanism may be expanded or compressed while maintaining a symmetrical position within said active portion.

9. In combination with a neutronic reactor which includes a central active portion containing fissionable material and a radiation shield surrounding said active portion, control apparatus for controlling the reactivity of said reactor, said apparatus comprising a longitudinally expansible coiled spring containing neutron absorbing material, said spring being disposed wholly within said active portion and centrally thereof with respect to the direction of expansion and compression, and a pair of longitudinally movable rods connected to opposing ends of said spring, respectively, and extending through said shield exteriorly of said reactor, whereby by equal movements of said rods in opposite directions said spring may be expanded or compressed while maintaining a symmetrical position within said active portion.

10. In combination with a neutronic reactor which includes a central active portion containing fissionable material and a radiation shield surrounding said active portion, control apparatus for controlling the reactivity of said reactor, said apparatus comprising a longitudinally expansible mechanism formed of a plurality of interconnected link elements containing neutron absorbing material, said mechanism being disposed wholly within said active portion and centrally thereof with respect to the direction of expansion and compression, and a pair of longitudinally movable rods connected to opposing ends of said mechanism, respectively, and extending through said shield exteriorly of said reactor, whereby by equal movements of said rods in opposite directions said mechanism may be expanded or compressed while maintaining a symmetrical position within said active portion.

References Cited in the file of this patent

FOREIGN PATENTS

| | | |
|---|---|---|
| 114,150 | Australia | May 2, 1940 |
| 114,151 | Australia | May 3, 1940 |
| 861,390 | France | Oct. 28, 1940 |

OTHER REFERENCES

Smyth: "Atomic Energy for Military Purposes," pages 22, 103, 104, 177, August 1945. (Copy may be purchased from Supt. of Documents, Washington 25, D.C.)

Kelly et al.: "Physical Review" 73, 1135–9 (1948).